(12) United States Patent
Harrison et al.

(10) Patent No.: US 7,624,193 B2
(45) Date of Patent: Nov. 24, 2009

(54) MULTI-VENDOR MEDIATION FOR SUBSCRIPTION SERVICES

(75) Inventors: Bret E. Harrison, Clayton, NC (US); Brett G. King, Cary, NC (US); Timothy J. Smith, Raleigh, NC (US); David E. Taber, Wake Forest, NC (US); Aaron J. Tarter, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 10/846,242

(22) Filed: May 14, 2004

(65) Prior Publication Data

US 2005/0256970 A1  Nov. 17, 2005

(51) Int. Cl.
*G06F 15/173* (2006.01)
*G01R 31/08* (2006.01)

(52) U.S. Cl. .............. 709/238; 709/220; 370/235; 370/252

(58) Field of Classification Search .............. 709/238
See application file for complete search history.

(56) References Cited

U.S. PATENT DOCUMENTS

| 5,983,366 | A | * | 11/1999 | King ................... 714/38 |
| 6,070,192 | A | | 5/2000 | Holt et al. ............... 709/227 |
| 7,089,293 | B2 | * | 8/2006 | Grosner et al. .......... 709/217 |
| 7,218,613 | B1 | * | 5/2007 | Doskow et al. .......... 370/252 |
| 2001/0010053 | A1 | * | 7/2001 | Ben-Shachar et al. .... 709/105 |
| 2002/0029268 | A1 | | 3/2002 | Baca et al. ............. 709/224 |
| 2002/0126656 | A1 | * | 9/2002 | Park ..................... 370/352 |
| 2002/0174191 | A1 | * | 11/2002 | Robertson et al. ....... 709/217 |
| 2003/0046420 | A1 | * | 3/2003 | Breiter et al. ........... 709/237 |
| 2003/0172145 | A1 | | 9/2003 | Nguyen ................. 709/223 |
| 2004/0218587 | A1 | * | 11/2004 | Kim et al. .............. 370/352 |
| 2005/0096012 | A1 | * | 5/2005 | Borella et al. .......... 455/411 |

OTHER PUBLICATIONS

"The Use of Mediation and Ontology Technologies for Software Component Information Retrieval", Braga et al., proceedings of the 2001 symposium on Software Reusability: Putting Software Reuse in Context.*

(Continued)

*Primary Examiner*—George C Neurauter, Jr.
*Assistant Examiner*—Mark D Fearer
(74) *Attorney, Agent, or Firm*—VanLeeuwer & VanLeeuwen

(57) ABSTRACT

A mediation server assigns customized "plug-ins" to particular network access servers (NAS) that allow a service provider application to use a single interface to communicate with multiple types of NASs. Vendor specific details of NAS transaction processing are hidden in the customized plug-ins implementations in which a service provider application has no knowledge of such transaction processing information. The mediation server extracts a user identifier from a call request, and uses the user identifier to select a mediation handler plug-in. The mediation server then uses the mediation handler plug-in to communicate with a particular NAS. In addition, a RADIUS server uses a NAS identifier to assign a RADIUS handler plug-in to a NAS session, and uses the assigned RADIUS handler plug-in to communicate with the NAS.

18 Claims, 7 Drawing Sheets

OTHER PUBLICATIONS

'Mediation Handlers and Mediation Handler Lists', WebSphere Application Server Express, Version 6.0.x, IBM, 2005.*

Lim et al., "iCMOS: an ADSL Service Provisioning System based upon Workflow Management," IEEE, 2002, Session 21: Operations Support Systems, pp. 799-811.

Hong et al., "An Integrated Network Management Framework for Internet Access Service using ATM over ADSL Technology," IEEE, 2002, pp. 24-31.

Carew et al., "Competition for the IN service provider," IEEE, 1996, 6 pages.

* cited by examiner

```
User {
    Integer user_id;           — 205
    String username;           — 210
    String password;           — 215
    ArrayOfIntergers service_ids;  — 220
}
```

*Figure 2A*

```
Service {
    Integer service_id;            — 235
    String servicename;            — 240
    Integer service_manager_id;    — 245
    LinkedList parameters;         — 250
}
```

*Figure 2B*

```
ServiceManagerPlug-in {
    Integer service_manager_id;    — 265
    String service_manager_type;   — 270
    String RADIUS_handler_key;     — 275
    String mediation_handler_key;  — 280
}
```

*Figure 2C*

```
MediationHandler {                                              ⟵ 300
    String mediation_handler_key;  ⟵ 305
    Integer initialize();  ⟵ 310
                                                        ⟵ 315
    Integer loginSubscriber (String username, String password, String
    user_ip_address, Integer user_tcp_port);
    Integer logoutSubscriber( String username, String user_ip_address,
    Integer user_tcp_port);                             ⟵ 320
                                                        ⟵ 325
    Integer activateService(String username, String password, String
    user_ip_address, Integer user_tcp_port, String service_name);
    Integer deactivateService( String username, String
    user_ip_address, Integer user_tcp_port, String service_name);
    ArrayOfIntegers getActiveServices(String username, String   ⟵ 330
    user_ip_address, Integer user_tcp_port);
}                                                           ⟵ 335
```

*Figure 3A*

```
RADIUSHandler {                                                 ⟵ 350
                                    ⟵ 360
    String RADIUS_handler_key;
    String secret;  ⟵ 370
                                                        ⟵ 380
    Integer handleAuthRequest( String message);
                                                        ⟵ 390
    Integer handleAcctRequest( String message);
}
```

*Figure 3B*

MULTI-VENDOR MEDIATION FOR SUBSCRIPTION SERVICES

BACKGROUND OF THE INVENTION

1. Technical Field

The present invention relates in general to a system and method for multi-vendor mediation for subscription services. More particularly, the present invention relates to a system and method for a service provider application to communicate with heterogeneous network access servers using a single interface.

2. Description of the Related Art

Traditional dial-in services use a network access server (NAS) in conjunction with a remote authentication dial-in user service (RADIUS) to authenticate and process user requests. RADIUS is a client/server protocol and software that enables remote access servers the ability to communicate with a central server in order to authenticate dial-in users and authorize their access to a requested system or service.

A NAS is a computer server that enables an independent service provider (ISP) the ability to provide connected customers with Internet access. A NAS interfaces to both a local telecommunication service provider, such as a phone company, and to the Internet backbone. NAS's are positioned on the edge of service provider networks and provide three main functions. First, they use RADIUS to make authentication, authorization, and accounting requests to the service provider for the subscribers. Second, they aggregate subscriber traffic into larger bandwidth data streams to be forwarded towards the core of the service provider network. And third, they enforce policies that define services that are provisioned for the subscriber. These policies are service-specific attributes, such as allowed network destinations, allocated network bandwidth, and delay tolerance.

In many service provider systems, a PPP protocol suite starts and ends a subscriber session. The PPP protocol suite includes specific protocols such as Challenge-Handshake Authentication Protocol (CHAP) and Password Authentication Procedure (PAP) that are used to authenticate a subscriber. These protocols contain fields for passing subscriber credentials. A service provider using the PPP protocol requires that its subscribers use a PPP client that prompts the subscriber for the credentials, and then sends an authentication request that includes the credentials to the NAS. The NAS acts as a PPP peer and terminates the PPP session. It extracts the subscriber credentials, and inserts them as attributes in a RADIUS access request, which it issues to a RADIUS server on the subscriber's behalf. The RADIUS server checks the subscriber credentials against a user catalog and responds with a reject or accept message.

The advent of broadband services has lead to a need for authentication mechanisms other than those that are available in the PPP protocol suite. The majority of broadband solutions today use Dynamic Host Configuration Protocol (DHCP) for subscriber sessions. DHCP is a communications protocol that allows network administrators to manage centrally, and automates Internet Protocol (IP) address assignments in an organization's network. Using the Internet Protocol, each machine that connects to the Internet requires a unique IP address.

DHCP, however, does not include fields for passing user credentials and, therefore, does not include a built-in mechanism for authenticating subscribers. This gives rise to the need for executing authentication transactions from service provider applications using other mechanisms, such as web applications that use HTML login screens.

A challenge found is the lack of a vendor neutral mechanism for authenticating DHCP subscribers. Another challenge found is a lack of a dynamic vendor neutral mechanism for activating and deactivating network services for DHCP subscribers. While there are vendor specific solutions to these challenges, there is not a middleware solution that has effectively addressed a solution across multiple vendor hardware platforms. These vendor specific solutions do not interoperate with other vendor equipment for providing subscriber services.

What is needed, therefore, is a system and method for providing a vendor neutral interface to support subscriber service requests when communicating with heterogeneous network access servers.

SUMMARY

It has been discovered that the aforementioned challenges are resolved by using a mediation server to assign and use customized "plug-ins" with particular network access servers (NASs) that allows a service provider application to use a single interface to communicate with multiple types of NASs. Vendor specific details of NAS transaction processing are hidden in the implementations of the customized plug-ins such that a service provider application may use a single interface to send calls to multiple types of NAS equipment without knowledge of such transaction processing information.

A service provider application sends a call that includes a user identifier (i.e. user name) to a mediation server. The mediation server includes a mediation handler look-up and a mediation handler pool. The mediation handler look-up associates mediation handlers to particular network access servers. The mediation handlers are located in the mediation handler pool.

The mediation handler look-up proceeds through a series of steps in order to assign a mediation handler to a particular NAS. First, the mediation handler look-up extracts a user identifier from the call it receives from the service provider application. The mediation handler look-up uses the user identifier to identify "service identifiers" by matching the user identifier with one of the user catalog entries that are located in a user catalog. Each user catalog entry includes a user identifier, a user name, a password, and service identifiers. For example, a service provider may have a "Gold" service level that corresponds to a particular amount of bandwidth and a particular amount of time that a user may access the Internet. In this example, the "Gold" service may have a corresponding service identifier of "1234."

Second, the mediation handler look-up identifies service manager identifiers that correspond to the service identifiers by matching the service identifiers with one of the service catalog entries that are located in a service catalog. Once the service manager identifiers are identified, the mediation handler look-up identifies "mediation handler keys" that correspond to the service manager identifiers by matching the service manager identifiers with one of the plug-in catalog entries that are located in a plug-in catalog. The mediation handler keys inform the mediation handler look-up as to which mediation handler (i.e. plug-in) to use in order to communicate with a particular NAS.

Third, the mediation handler look-up uses the identified mediation handler key to locate a specific handler that is located in the mediation handler pool, and assigns the particular handler to the NAS session. The mediation handler look-up uses the assigned mediation handler to send a call to the NAS.

The NAS receives the call, and proceeds with a user logon process by sending an access request to the RADIUS server. The RADIUS server is responsible for authorizing users that attempt to logon to a service provider network. The RADIUS server includes a RADIUS handler look-up and a RADIUS handler pool. The RADIUS handler pool includes RADIUS handlers (i.e. plug-ins) that the RADIUS server uses to interface with particular NASs.

The RADIUS handler look-up extracts a NAS identifier (i.e. an IP address) from the access request, and uses the NAS identifier to identify a corresponding RADIUS handler key by matching the NAS identifier with one of the plug-in catalog entries that are located in a plug-in catalog. The RADIUS handler look-up uses the RADIUS handler key to locate a corresponding RADIUS handler.

The RADIUS server proceeds to authorize the user, and, once authorization is complete, the RADIUS server updates a user catalog entry, signifying that the user is logged in. The assigned RADIUS handler sends a response code to the NAS that includes either an "accept" or "reject" message, depending on whether the user is authorized. In turn, the NAS sends the response code to the mediation server. The mediation server uses its assigned mediation handler to receive the response code, and forwards the response code to the service provider application for processing.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2A is an example of a structure that defines a user catalog entry;

FIG. 2B is an example of a structure that defines a service catalog entry;

FIG. 2C is an example of a structure that defines a plug-in catalog entry;

FIG. 3A is an example of a structure that defines a mediation handler plug-in that is included in a mediation handler pool;

FIG. 3B is a an example of a structure that defines a RADIUS handler plug-in that is included in a RADIUS handler pool;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
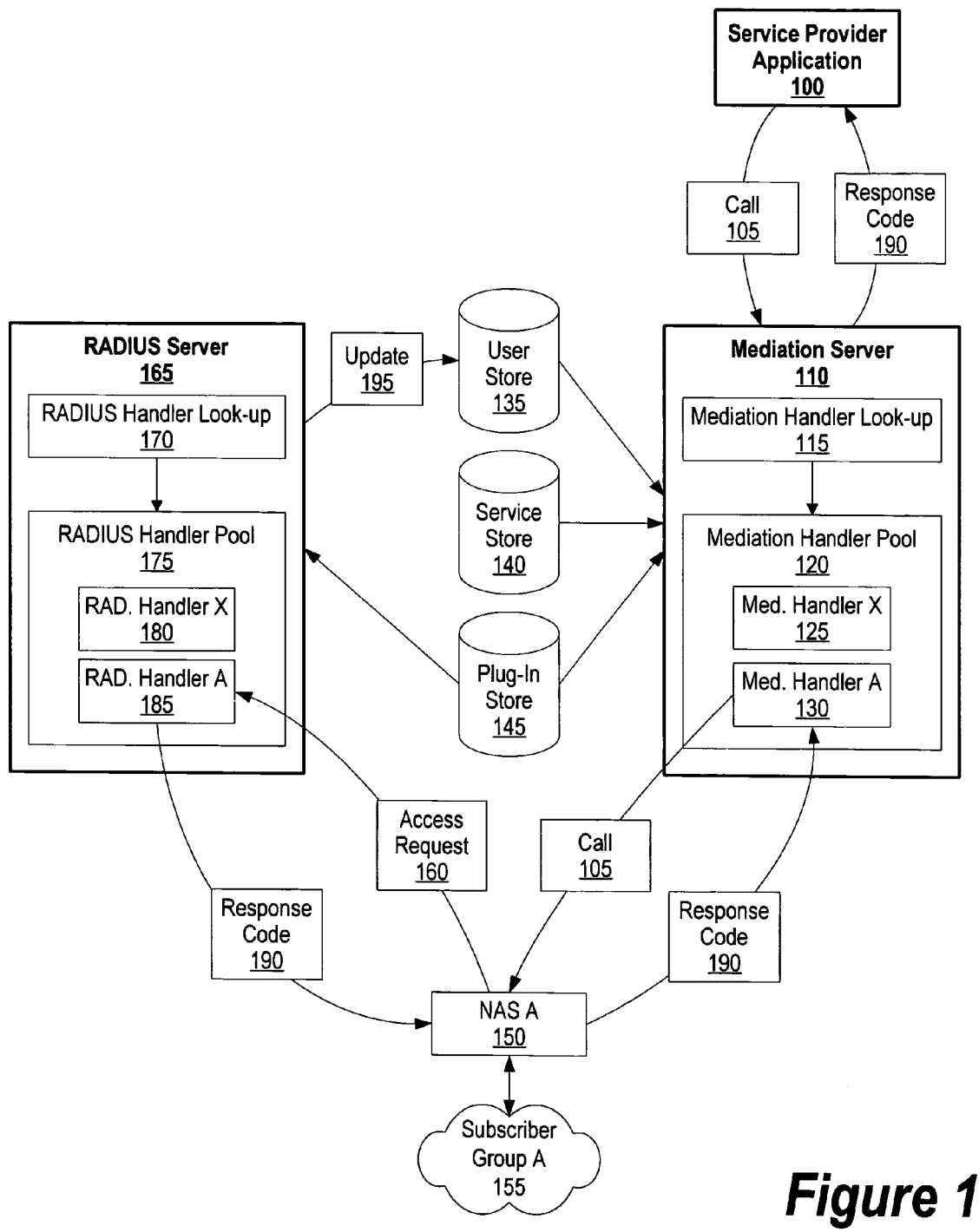
FIG. 1 is a diagram showing a mediation server and a RADIUS server processing a user request.

FIG. 1 is a diagram showing a mediation server and a RADIUS server processing a user request. Service provider application 100 communicates with network access server (NAS) A 150 using mediation server 110. Mediation server 110 includes NAS specific details into customized "plug-ins" that allows service provider application 100 to use a single interface to send calls to multiple types of NAS equipment without knowledge of such transaction processing information.

Service provider application 100 sends call 105 that includes a user identifier (i.e. user name) to mediation server 110. Mediation server 110 includes mediation handler look-up 115 and mediation handler pool 120. Mediation handler look-up 115 associates mediation handlers, which are located in mediation handler pool 120, to particular network access servers (NAS). FIG. 1 shows that two active mediation handlers, which are mediation handler X 125 and mediation handler A 130, are included in mediation handler pool 120.

Mediation handler look-up 115 proceeds through a series of steps in order to assign a mediation handler to a particular NAS. First, mediation handler look-up 115 identifies "service identifiers" that correspond to call 105's user identifier by matching the user identifier with one of the user catalog entries that are located in user store 135. Each user catalog entry includes a user identifier, a user name, a password, and service identifiers. For example, a service provider may have a "Gold" service level that corresponds to a particular amount of bandwidth and a particular amount of time that a user may access the Internet. In this example, the "Gold" service may have a corresponding service identifier of "1234." User store 135 may be stored on a nonvolatile storage area, such as a computer hard drive.

Second, mediation handler look-up 115 identifies service manager identifiers that correspond to the service identifiers by matching the service identifiers with one of the service catalog entries that are located in service store 140. Service store 140 may be stored on a nonvolatile storage area, such as a computer hard drive. Once the service manager identifiers are identified, mediation handler look-up 115 identifies "mediation handler keys" that correspond to the service manager identifiers by matching the service manager identifiers with one of the plug-in catalog entries that are located in plug-in store 145. The mediation handler keys inform mediation handler look-up 115 as to which mediation handler (i.e. plug-in) to use in order to communicate with a particular NAS, such as NAS A 150.

Third, mediation handler look-up 115 uses the identified mediation handler key to locate a particular handler in mediation handler pool 120, and assign the particular handler to a NAS session. Mediation handler look-up 115 assigns mediation handler A 130 to NAS A 150, and sends call 105 to NAS A 150 using mediation handler A 130.

NAS A 150 receives call 105, and proceeds with the user logon process by sending access request 160 to RADIUS server 165. RADIUS server 165 is responsible for authorizing users that attempt to logon to a service provider network. RADIUS server 165 includes RADIUS handler look-up 170 and RADIUS handler pool 175. RADIUS handler pool 175 includes RADIUS handlers (i.e. plug-ins) that RADIUS server 165 uses to interface with particular NAS's. FIG. 1 shows that RADIUS handler pool 175 includes RADIUS handler X 180 and RADIUS handler A 185.

RADIUS handler look-up 170 extracts a NAS identifier (i.e. an IP address) from access request 160, and uses the NAS identifier to identify a corresponding RADIUS handler key by matching the NAS identifier with one of the plug-in catalog entries that are located in plug-in store 145. RADIUS handler look-up 170 uses the RADIUS handler key to locate a corresponding RADIUS handler in RADIUS handler pool 175.

RADIUS server 165 proceeds to authorize the user, and, once authorization is complete, RADIUS server 165 sends update 195 to user store 135 which updates the user's catalog entry (i.e. the user is logged in). RADIUS server 165 uses RADIUS handler A 185 to send response code 190 to NAS A 150. Response code 190 includes either an "accept" or "reject" message, depending on whether the user is authorized. In turn, NAS A 150 sends response code 190 to mediation server 110. Mediation server 110 uses mediation handler A 130 to receive response code 190, and forwards response code 190 to service provider application 100 for processing.

FIG. 2A is an example of a structure that defines a user catalog entry. Each user that is part of a service provider network has a corresponding user catalog entry. The user catalog entries are stored in a user catalog, which is used to associate "service identifiers" with "user identifiers."

Structure 200 includes lines 205 through 220. Line 205 identifies that a "user_id" is an integer and is included in the structure. The mediation server receives a call request from a service provider application whereby the call request includes a user identifier. The mediation server uses the user identifier to identify a corresponding user catalog entry. Lines 210 and 215 show that a user name and password are included in the structure. The mediation server may also receive a user name from the service provider application and use the user name to identify a corresponding user catalog entry.

Line 220 shows that the structure includes one or more "service_id's" that correspond to the user identifier. For example, a service provider may have a "Gold" service level that corresponds to a particular amount of bandwidth and a particular amount of network access allotment time. In this example, the "Gold" service may have a corresponding service identifier of "1234." When the mediation handler identifies a user catalog entry that corresponds to the user identifier, the mediation server extracts the service identifiers from the user catalog entry and uses the service identifiers to locate a corresponding service catalog entry (see FIG. 2B and corresponding text for further details regarding service catalog entries).

FIG. 2B is an example of a structure that defines a service catalog entry. Service catalog entries are included in a service catalog, which is used to associate "service identifiers" with "service manager identifiers." Structure 230 includes lines 235 through 250. Line 235 shows that a "service_id" is an input to the structure. Line 240 shows that the structure also includes a service name. For example, a service provider may have service names such as "Gold" and "Silver" that signify an amount of bandwidth a particular user is allotted.

Line 245 shows that the structure includes a service manager identifier, which will be used to identify mediation handler keys and RADIUS handler keys that are included in a plug-in catalog entry (see FIG. 2C and corresponding text for further details regarding plug-in catalog properties). And, line 250 shows that the structure includes a linked list of parameters, such as a user's bandwidth and time allocation. The parameters may be passed to a network access server (NAS) in order for the NAS to manage a user's Internet session.

FIG. 2C is an example of a structure that defines a plug-in catalog entry. Plug-in catalog entries are included in a plug-in catalog which is used to associate "service manager identifiers" with "mediation handler keys" and RADIUS handler keys." Structure 260 includes lines 265 through 280. Line 265 shows that the structure uses a "service_manager_id" as an input. Line 270 shows that the structure includes a service manager type, such as "Server XYZ". The mediation handler uses the service manager type when creating an appropriate handler if a particular handler has not yet been created (see FIG. 5 and corresponding text for further details regarding handler creation steps). Lines 275 and 280 show that each service manager plug-in entry includes a corresponding RADIUS handler key and a mediation handler key. The mediation server and the RADIUS server use the handler keys in order to select an appropriate handler from their respective handler pools (see FIGS. 5, 6, and corresponding text for further details regarding handler selection).

FIG. 3A is an example of a structure that defines a mediation handler plug-in that is included in a mediation handler pool. Handler plug-in interfaces are defined such that they are able to process necessary authentication, service activation, and service deactivation transactions for network access servers (NASs). Vendor specific details of the transaction processing are hidden in the implementations of the customized plug-ins so that a service provider application may use a single interface to send calls to multiple types of NAS equipment without knowledge of such transaction processing information.

Structure 300 includes lines 305 through 335. Line 305 shows that a mediation server uses a mediation handler key in order to locate a corresponding mediation handler. The mediation handler acquires a mediation handler key using a user identifier that it receives from a service provider application (see FIG. 5 and corresponding text for further details regarding mediation handler key acquisition steps).

The mediation server also receives particular commands from the service provider application in which it passes to an appropriate mediation handler to execute. Lines 310 through 335 support such commands. Line 310 is executed when a mediation server receives an "initialize" command from the service provider application. Line 315 is executed when a mediation server receives a "login subscriber" command from the service provider application. Line 320 is executed when a mediation server receives a "logout subscriber" command from the service provider application. Line 325 is executed when a mediation server receives an "activate service" command from the service provider application. Line 330 is executed when a mediation server receives a "deactivate service" command from the service provider application. And, line 335 is executed when a mediation server receives a "get active services" command from the service provider application.

FIG. 3B is an example of a structure that defines a RADIUS handler plug-in that is included in a RADIUS handler pool. Structure 350 includes lines 360 through 390. Line 360 shows that a RADIUS server uses a RADIUS handler key in order to locate a corresponding RADIUS handler. The RADIUS handler acquires a RADIUS handler key using a network access server (NAS) identifier, such as an IP address, that it receives from the NAS (see FIG. 6 and corresponding text for further details regarding mediation handler key acquisition steps).

Line 370 shows that a "Secret" field is passed in a RADIUS request that is used by RADIUS servers to authenticate RADIUS clients. Line 380 shows that each RADIUS handler includes an "authorization request" command for processing a request it receives from a NAS. In addition, line 390 shows that each RADIUS handler includes an "account request" command for processing a request it receives from the NAS. For example, account requests are used to track user session information such as the amount of time that has passed since a user's log in, number of bytes downloaded, and number of bytes uploaded.

Figure 4:
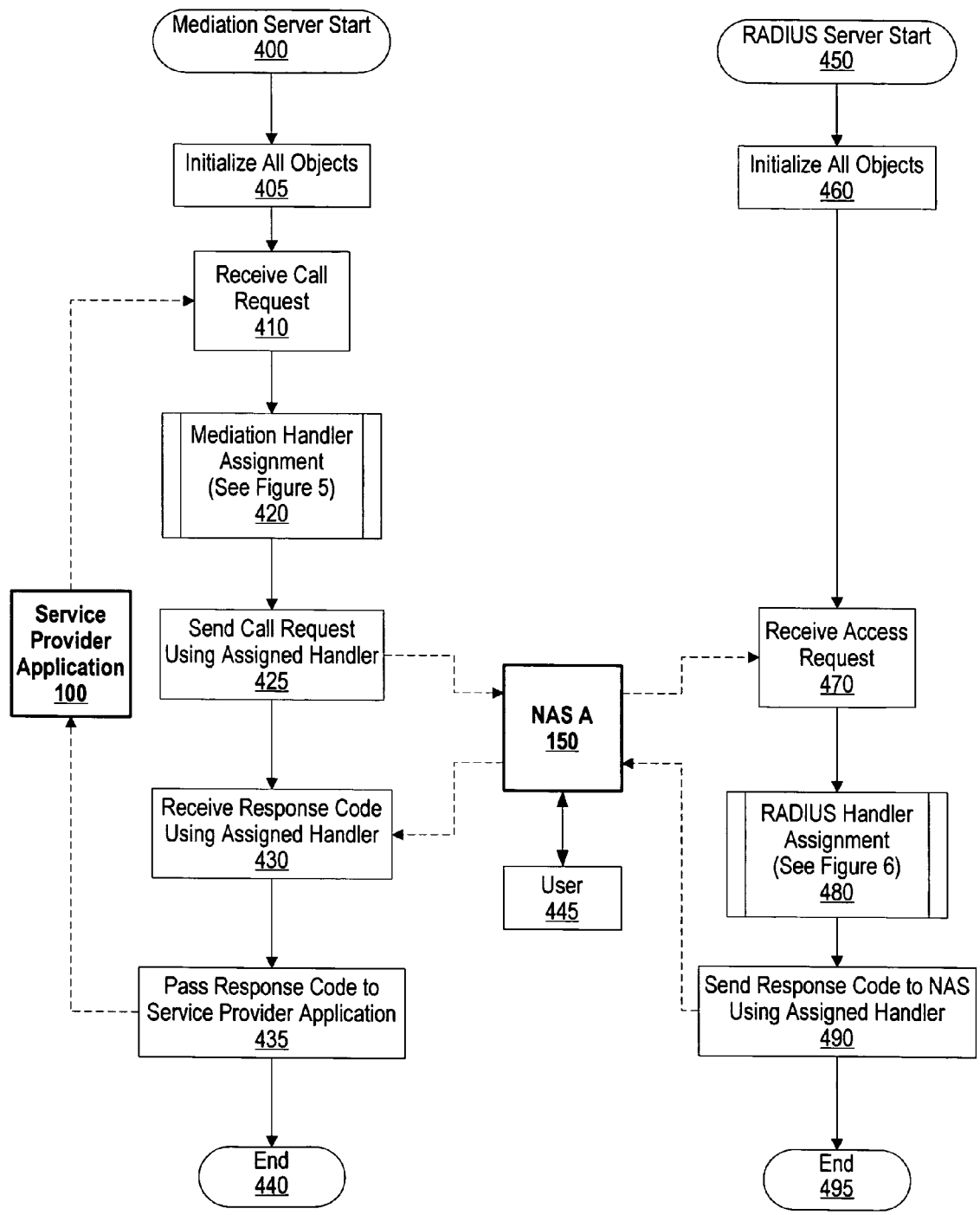
FIG. 4 is a high level flow chart showing steps taken in processing a user request.

FIG. 4 is a high level flow chart showing steps taken in processing a user request. Mediation server processing commences at 400, whereupon the mediation server initializes mediation handler objects in a mediation handler pool (step 405). The mediation server uses the mediation handlers to communicate with network access servers (see FIG. 1 and corresponding text for further details regarding network access communication).

The mediation server receives a call request from service provider application 100 at step 410. The call request includes a user identifier and may also include a user name and password that corresponds to a user (e.g. user 445) that is attempting to log in through a particular network access server (NAS), such as NAS A 150. The mediation server uses the user identifier to locate a mediation handler that corresponds to the NAS in order to communicate with the NAS (pre-defined process block 420, see FIG. 5 and corresponding text for further details). Service provider application 100 and NAS A 150 are the same as that shown in FIG. 1. Once the mediation server locates a corresponding mediation handler, the mediation server sends the call request to NAS A 150 at step 425.

RADIUS server processing commences at 450, whereupon the RADIUS server initializes RADIUS handler objects in a RADIUS handler pool (step 460). The RADIUS server uses the RADIUS handlers to communicate with network access servers (see FIG. 1 and corresponding text for further details regarding network access communication). The RADIUS server receives an access request from NAS A 150 at step 470. The access request corresponds to user 445 requesting access to log in to a service provider network. The RADIUS server uses a NAS identifier (i.e. an IP address) to locate a corresponding RADIUS handler, and processes the access request (pre-defined process block 480, see FIG. 6 and corresponding text for further details). The RADIUS handler sends a response code (i.e. accept or reject) to NAS A 150 at step 490. RADIUS server processing ends at 495.

NAS A 150 receives the response code from the RADIUS server, and forwards the response code to the mediation server. The mediation server receives the response code using its assigned mediation handler at step 430. In turn, the mediation handler forwards the response code to service provider application 100 at step 435. Mediation server processing ends at 440.

Figure 5:
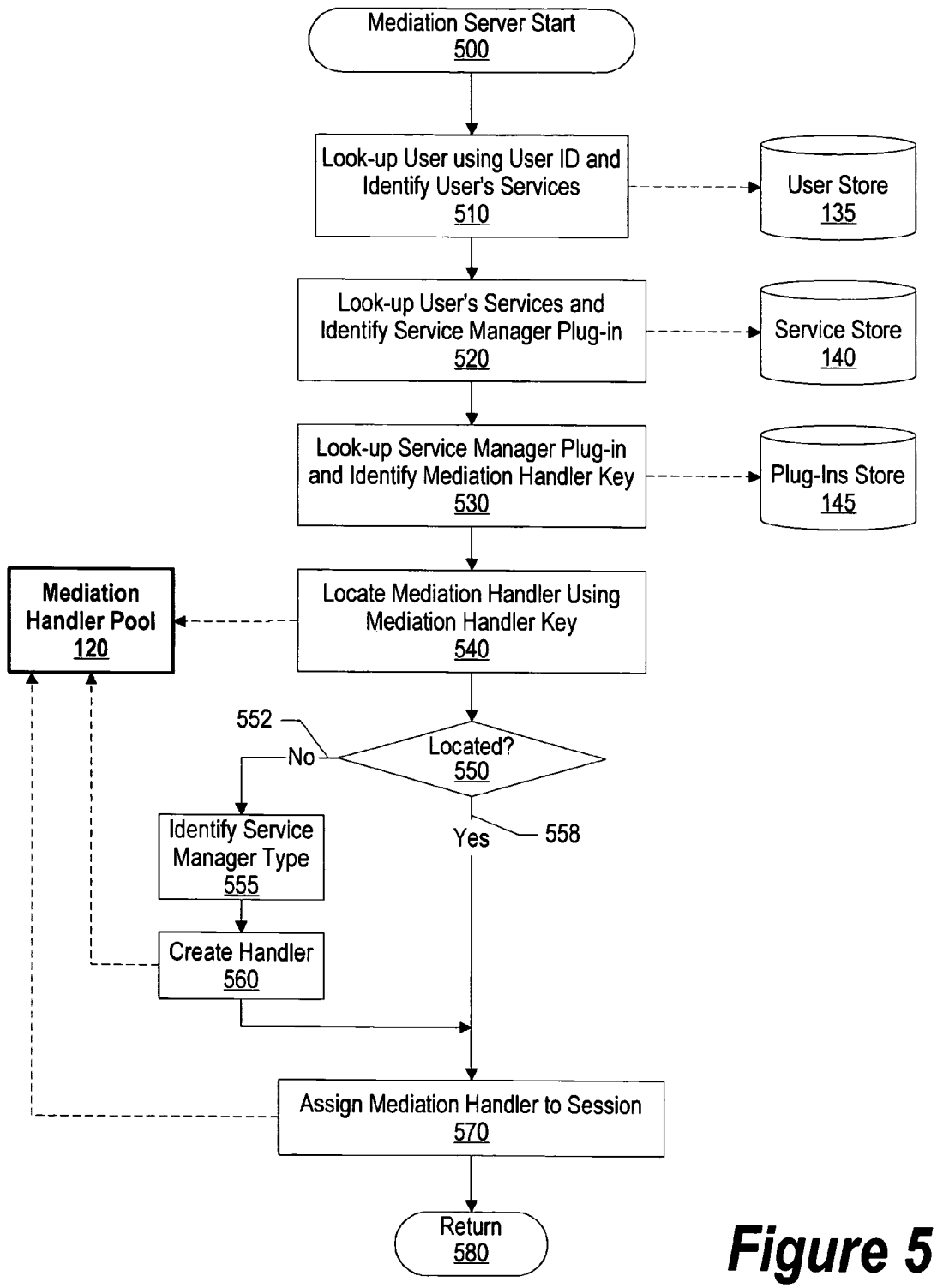
FIG. 5 is a flowchart showing steps taken in a mediation server assigning a mediation handler to a session.

FIG. 5 is a flowchart showing steps taken in a mediation server assigning a mediation handler to a session. Processing commences at 500, whereupon processing uses a user identifier it received from a service provider application to locate a user catalog entry located in user store 135, and identify a user's corresponding services (e.g. service identifiers) (step 510). User store 135 is the same as that shown in FIG. 1.

At step 520, processing uses the identified service identifiers to locate a corresponding service catalog entry located in service store 140, and identify service manager identifiers that are included in the corresponding service catalog entry. Service store 140 is the same as that shown in FIG. 1. At step 530, processing uses the identified service manager identifiers to locate a corresponding plug-in catalog entry that is located in plug-ins store 145, and identify a mediation handler key that is included in the plug-in catalog entry. Service store 145 is the same as that shown in FIG. 1.

The mediation server uses the mediation handler key to locate a corresponding mediation handler that is included in mediation handler pool 120 (step 540). Mediation handler pool 120 is the same as that shown in FIG. 1. A determination is made as to whether the mediation server located a corresponding mediation handler (decision 550). If a corresponding mediation handler was not located, decision 550 branches to "No" branch 552 whereupon, at step 555, processing identifies a service manager type (i.e. Cisco XYZ) that is included in the plug-in catalog (see FIG. 2C and corresponding text for further details regarding service manager types). Processing creates a mediation handler in mediation handler pool 120 that corresponds to the service manager type at step 560.

On the other hand, if processing did locate a mediation handler that corresponds to the mediation handler key, decision 550 branches to "Yes" branch 558 bypassing mediation handler creation steps. Processing assigns the mediation handler to the session at step 570, and returns at 580. In one embodiment, if the mediation server receives an error code during one of the steps shown in FIG. 5, the mediation server immediately stops processing the request, and returns.

Figure 6:
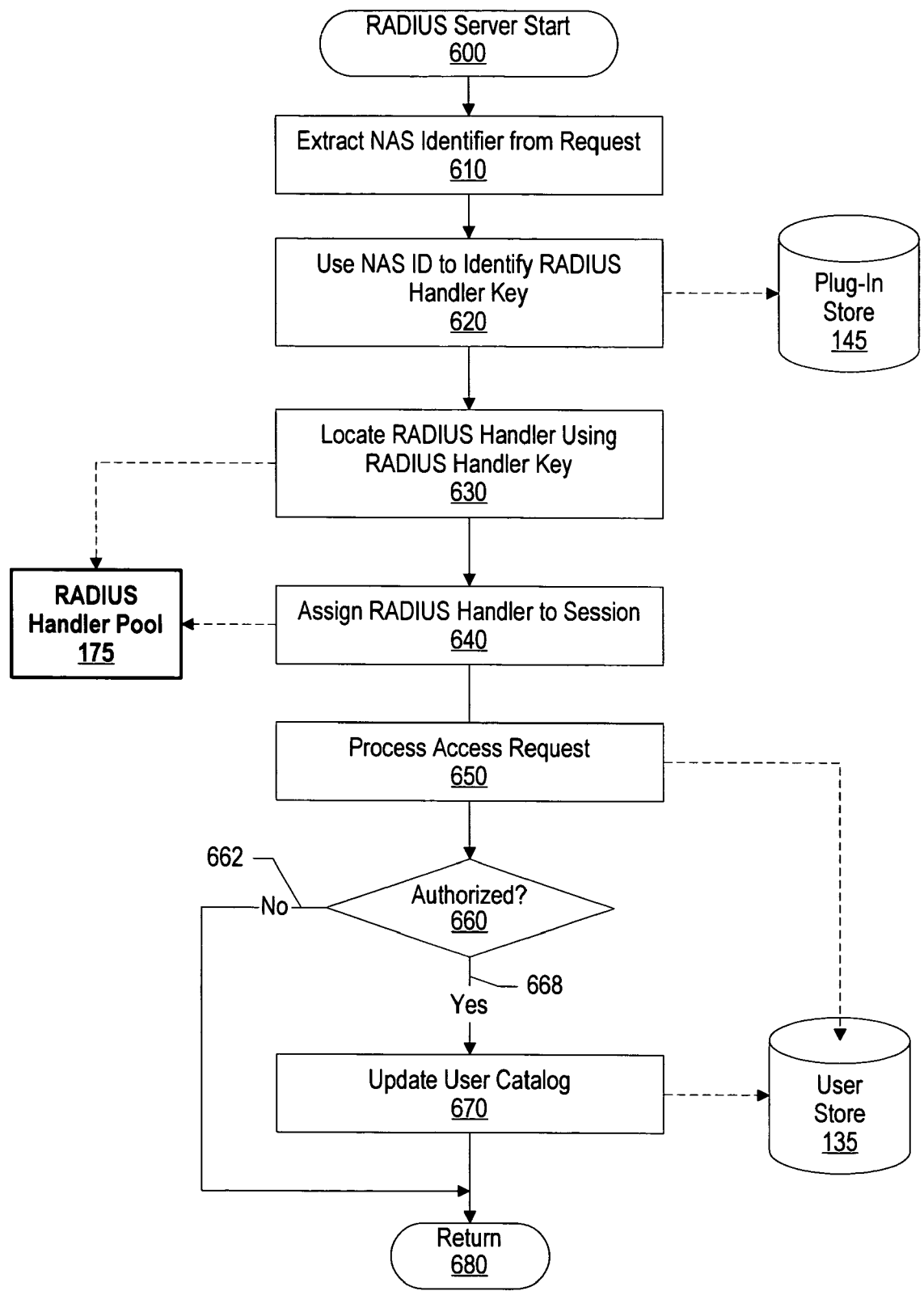
FIG. 6 is a flowchart showing steps taken in a RADIUS server assigning a RADIUS handler to a session.

FIG. 6 is a flowchart showing steps taken in a RADIUS server assigning a RADIUS handler to a session. Processing commences at 600, whereupon processing extracts a network access server (NAS) identifier from an access request that it received from a NAS (step 610). At step 620, processing uses the NAS identifier to locate a plug-in catalog entry that is located in plug-in store 145, and identify a RADIUS handler key that is included in the plug-in catalog entry. Plug-in store 145 is the same as that shown in FIG. 1.

RADIUS processing uses the RADIUS handler key to locate a RADIUS handler in RADIUS handler pool 175 (step 630). Once located, the RADIUS server assigns the RADIUS handler to the NAS session at step 640, and processes the access request at step 650 by accessing user catalog entries that are included in user store 135. For example, user "ABC" may wish to log in to the Internet, and RADIUS processing access the user's corresponding user catalog entry to validate the user's password. User store 135 is the same as that shown in FIG. 1.

A determination is made as to whether the user is authorized (decision 660). If the user is authorized, decision 660 branches to "Yes" branch 668 whereupon processing updates the user's catalog entry, noting that the user is logged in (step 670). On the other hand, if the user was not authorized, decision 660 branches to "No" branch 662 bypassing catalog updating steps. Processing returns at 680.

Figure 7:
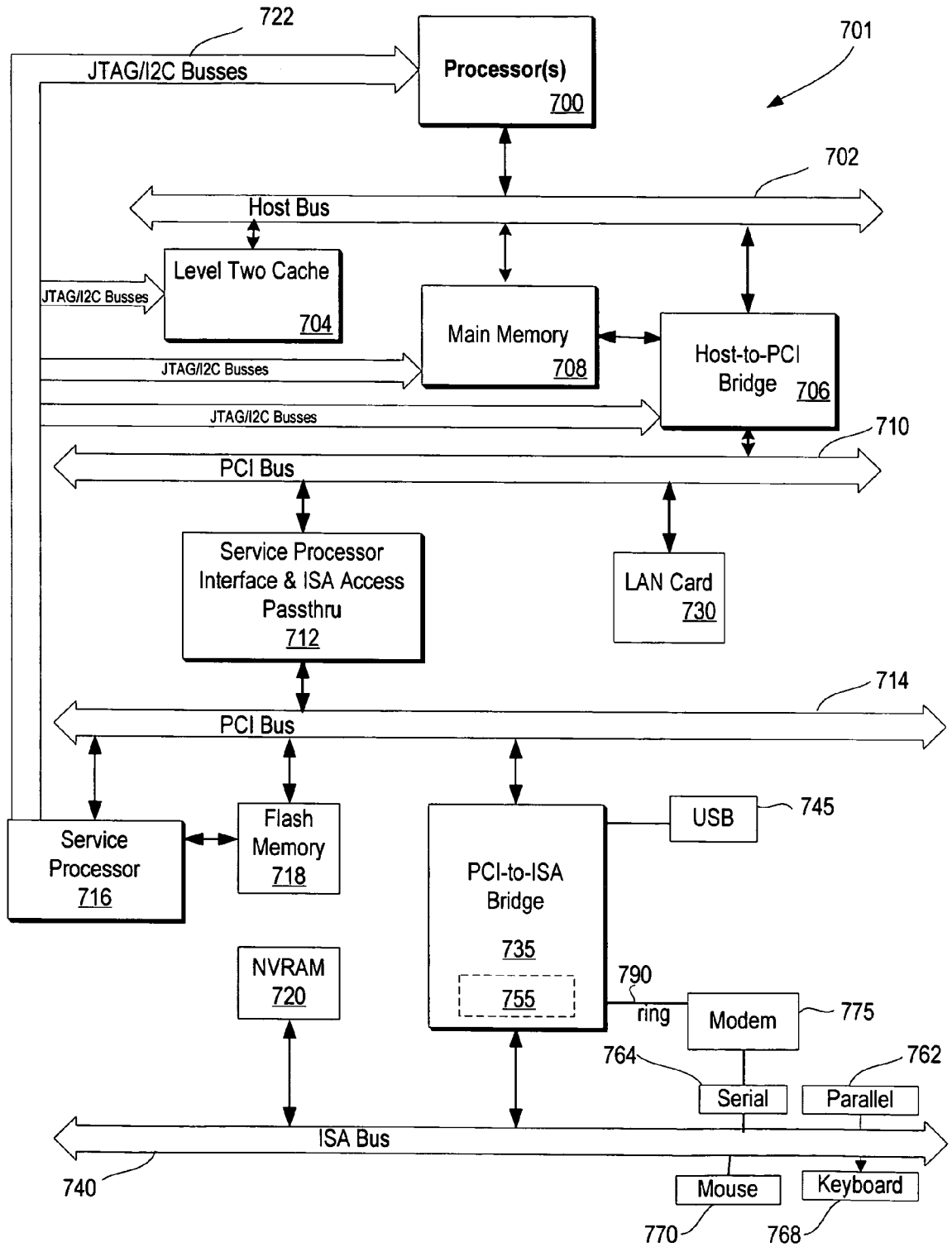
FIG. 7 is a block diagram of an information handling system capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to- ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    receiving a call request from a service provider application at a mediation server, the call request including a user identifier;
    determining whether one of a plurality of mediation handlers corresponds to both the user identifier and a second server, wherein each of the plurality of mediation handlers is different;
    in response to determining that one of the plurality of mediation handlers corresponds to both the user identifier and the second server:
        selecting a mediation handler from the plurality of mediation handlers that corresponds to the user identifier and the second server; and
        using the selected mediation handler to execute the call request, which results in sending the call request from the mediation server to the second server; and
    in response to determining that the mediation handler is not included in the mediation handler pool:
        creating a new mediation handler at the mediation server, wherein the new mediation handler is adapted to interface the service provider application to the second server, the second server being a network access server and different than the mediation server; and
        using the new mediation handler to execute the call request, which results in sending the call request from the mediation server to the second server.

2. The method of claim 1 wherein the selecting further comprises:
    identifying a service identifier using the user identifier;
    identifying the service manager identifier using the service identifier;
    identifying a mediation handler key using the service manager identifier; and
    locating the selected mediation handler using the mediation handler key.

3. The method of claim 1 further comprising:
    receiving a response code from the second server using the mediation handler, the response code corresponding to the call request; and
    forwarding the response code to the service provider application.

4. The method of claim 1 wherein a third server is adapted to identify a RADIUS handler from a plurality of RADIUS handlers that corresponds to the new mediation handler.

5. The method of claim 4 wherein the third server is further adapted to process an access request from the second server using the identified RADIUS handler.

6. The method of claim 5 wherein the processing includes sending a response code to the second server, the response code corresponding to the access request.

7. An information handling system comprising:
    one or more processors;
    a memory accessible by at least one of the processors;
    a nonvolatile storage area accessible by at least one of the processors;

a set of instructions stored in the memory and executed by at least one of the processors in order to perform actions of:
  receiving a call request from a service provider application at the information handling system, the call request including a user identifier;
  determining whether one of a plurality of mediation handlers corresponds to both the user identifier and a second server, wherein each of the plurality of mediation handlers is different;
  in response to determining that one of the plurality of mediation handlers corresponds to both the user identifier and the second server:
    selecting a mediation handler from the plurality of mediation handlers that corresponds to the user identifier and the second server; and
    using the selected mediation handler to execute the call request, which results in sending the call request from the information handling system to the second server; and
  in response to determining that the mediation handler is not included in the mediation handler pool:
    creating a new mediation handler at the information handling system, wherein the new mediation handler is adapted to interface the service provider application to the second server, the second server being a network access server and different than the information handling system; and
    using the new mediation handler to execute the call request, which results in sending the call request from the information handling system to the second server.

8. The information handling system of claim 7 wherein the set of instructions further performs actions of:
  identifying a service identifier using the user identifier;
  identifying the service manager identifier using the service identifier;
  identifying a mediation handler key using the service manager identifier; and
  locating the selected mediation handler using the mediation handler key.

9. The information handling system of claim 7 wherein the set of instructions further performs actions of:
  receiving a response code from the second server using the mediation handler, the response code corresponding to the call request; and
  forwarding the response code to the service provider application.

10. The information handling system of claim 7 wherein a third server is adapted to identify a RADIUS handler from a plurality of RADIUS handlers that corresponds to the new mediation handler.

11. The information handling system of claim 10 wherein the third server is further adapted to process an access request from the second server using the identified RADIUS handler.

12. The information handling system of claim 11 wherein the processing includes sending a response code to the second server, the response code corresponding to the access request.

13. A computer program product stored in a computer readable medium, comprising functional descriptive material that, when executed by an information handling system, causes the information handling system to perform actions that include:
  receiving a call request from a service provider application at the information handling system, the call request including a user identifier;
  determining whether one of a plurality of mediation handlers corresponds to both the user identifier and a second server, wherein each of the plurality of mediation handlers is different;
  in response to determining that one of the plurality of mediation handlers corresponds to both the user identifier and the second server:
    selecting a mediation handler from the plurality of mediation handlers that corresponds to the user identifier and the second server; and
    using the selected mediation handler to execute the call request, which results in sending the call request from the information handling system to the second server; and
  in response to determining that the mediation handler is not included in the mediation handler pool:
    creating a new mediation handler at the information handling system, wherein the new mediation handler is adapted to interface the service provider application to the second server, the second server being a network access server and different than the information handling system; and
    using the new mediation handler to execute the call request, which results in sending the call request from the information handling system to the second server.

14. The computer program product of claim 13 wherein the set of instructions further performs actions of:
  identifying a service identifier using the user identifier;
  identifying the service manager identifier using the service identifier;
  identifying a mediation handler key using the service manager identifier; and
  locating the selected mediation handler using the mediation handler key.

15. The computer program product of claim 13 wherein the information handling system further performs actions that include:
  receiving a response code from the second server using the mediation handler, the response code corresponding to the call request; and
  forwarding the response code to the service provider application.

16. The computer program product of claim 13 wherein a third server is adapted to identify a RADIUS handler from a plurality of RADIUS handlers that corresponds to the new mediation handler.

17. The computer program product of claim 16 wherein the third server is further adapted to process an access request from the second server using the identified RADIUS handler.

18. The computer program product of claim 17 wherein the processing includes sending a response code to the second server, the response code corresponding to the access request.

* * * * *